(12) United States Patent
Guibert et al.

(10) Patent No.: US 11,260,994 B2
(45) Date of Patent: Mar. 1, 2022

(54) ASSEMBLY COMPRISING A SUPPORT TOWER AND AT LEAST TWO SUPPORT SYSTEMS FOR PANELS OF A FUSELAGE SECTION OF AN AIRCRAFT

(71) Applicants: Airbus (S.A.S.), Blagnac (FR); Airbus Operations (S.A.S.), Toulouse (FR)

(72) Inventors: Patrick Guibert, Blagnac (FR); Jean-Mickael Brindeau, Blagnac (FR); Jacques Bouriquet, Toulouse (FR); Jean-Marc Datas, Toulouse (FR); Thomas Autret, Blagnac (FR); Nicolas Darbonville, Blagnac (FR)

(73) Assignees: Airbus (S.A.S.), Blagnac (FR); Airbus Operations (S.A.S.), Toulousse (FR)

( * ) Notice: Subject to any disclaimer, the term of this patent is extended or adjusted under 35 U.S.C. 154(b) by 4 days.

(21) Appl. No.: 17/005,898

(22) Filed: Aug. 28, 2020

(65) Prior Publication Data
US 2021/0061492 A1    Mar. 4, 2021

(30) Foreign Application Priority Data

Aug. 30, 2019 (FR) ...................................... 1909572

(51) Int. Cl.
*B23P 19/04* (2006.01)
*B64F 5/50* (2017.01)
(Continued)

(52) U.S. Cl.
CPC ................ *B64F 5/50* (2017.01); *B23P 19/04* (2013.01); *B64C 1/068* (2013.01); *B64F 5/10* (2017.01); *B23P 2700/01* (2013.01)

(58) Field of Classification Search
CPC .... B64F 5/50; B64F 5/10; B23P 19/04; B23P 2700/01; B64C 1/068; B64C 2211/00;
(Continued)

(56) References Cited

U.S. PATENT DOCUMENTS

| 6,011,482 A * | 1/2000 | Banks ...................... B21J 15/10 |
| | | 29/407.05 |
| 2006/0162140 A1 * | 7/2006 | Frauen ...................... B64F 5/10 |
| | | 29/407.04 |

(Continued)

FOREIGN PATENT DOCUMENTS

| EP | 2 644 360 A1 | 10/2013 |
| EP | 2 853 495 A1 | 4/2015 |

(Continued)

OTHER PUBLICATIONS

French Search Report for Application No. 1909572 dated May 28, 2020.

*Primary Examiner* — Jun S Yoo
(74) *Attorney, Agent, or Firm* — Jenkins, Wilson, Taylor & Hunt, P.A.

(57) ABSTRACT

An assembly including a support tower and at least two support systems, each bearing a panel of a section of an aircraft fuselage and including four fixing points. The support tower includes a tower extending along an axis X, a seat on which the tower is mounted and which is rotationally mobile about the axis X, and, for each fixing point, a fixing base mounted on a three-dimensional adjustment system mounted on the tower and motorized to displace the fixing base in two horizontal directions and one vertical direction, where each fixing point and the associated fixing base can be locked with one another to ensure the fixing of one with the other, and that can be unlocked to allow them to be separated. Such an assembly makes it possible to keep the various elements of the section vertical during assembly and allows for a space saving on the ground and a saving on transfer utilities.

12 Claims, 10 Drawing Sheets

(51) Int. Cl.
*B64F 5/10* (2017.01)
*B64C 1/06* (2006.01)

(58) Field of Classification Search
CPC ........ B64C 1/069; B21J 15/142; B23Q 7/048; B23Q 1/037; B23Q 1/0054; B23Q 1/25–265; B23Q 1/285–287; B23Q 3/18; B23Q 7/005; B23Q 7/04; B23Q 7/046
See application file for complete search history.

(56) References Cited

U.S. PATENT DOCUMENTS

| | | | |
|---|---|---|---|
| 2006/0231682 A1 | 10/2006 | Sarh | |
| 2012/0131779 A1* | 5/2012 | Umlauft | B62B 3/10 29/281.5 |
| 2013/0185925 A1* | 7/2013 | Sarh | B21J 15/30 29/559 |
| 2020/0094991 A1* | 3/2020 | Datas | B64F 5/50 |
| 2020/0223559 A1* | 7/2020 | Oberst | B23Q 1/28 |

FOREIGN PATENT DOCUMENTS

| | | |
|---|---|---|
| FR | 2 788 743 A1 | 7/2000 |
| FR | 2 912 680 A1 | 8/2008 |
| WO | WO 2007/148301 A2 | 12/2007 |

\* cited by examiner

ASSEMBLY COMPRISING A SUPPORT TOWER AND AT LEAST TWO SUPPORT SYSTEMS FOR PANELS OF A FUSELAGE SECTION OF AN AIRCRAFT

CROSS-REFERENCE TO RELATED APPLICATION

This application claims the benefit of and priority to French patent application 19 09572 filed on Aug. 30, 2019, the entire disclosure of which is incorporated by reference herein.

TECHNICAL FIELD

The disclosure herein relates to an assembly comprising a support tower and at least two support systems, each bearing a panel of a fuselage section of an aircraft and a production line using such an assembly.

BACKGROUND

A fuselage of an aircraft consists of several sections fixed in the extension of one another and each section is itself made up of several panels fixed to one another.

In a production line for such a fuselage, when the panels have to be fixed to one another, cradles are disposed around in order to horizontally support the panels and an access is mounted to allow operators to intervene in fixing operations. Then, to go from one station to another, the panels are transported by travelling overhead cranes.

Such a production line therefore requires a significant maneuvering space because of the presence of the cradles and of the access, as well as costly utilities such as the travelling overhead cranes.

It is therefore necessary to find a utility which simplifies the production of the sections of a fuselage.

SUMMARY

One object of the disclosure herein is an assembly comprising a support tower and at least two support systems, each bearing a panel of a fuselage section of an aircraft, in which the support tower allows the section to be held vertically while it is being manufactured.

To this end, an assembly is disclosed comprising a support tower and at least two support systems, each support system bearing a panel of a section of an aircraft fuselage and comprising four fixing points, the support tower comprising:
  a tower extending along an axis X,
  a seat on which the tower is mounted and which is rotationally mobile about the axis X, and
  for each fixing point, a fixing base mounted on a three-dimensional adjustment system mounted on the tower and motorized to displace the fixing base in two horizontal directions and one vertical direction, in which each fixing point and the associated fixing base can be locked with one another to ensure the fixing of one with the other, and can be unlocked to allow them to be separated.

Such an assembly makes it possible to hold the different elements of the section vertically during assembly and thus allows for a space saving on the ground and a saving on utilities for the transfer.

According to a particular embodiment, each three-dimensional adjustment system takes the form of three motorized cross tables of which a first is mounted to slide in the tower, a second is mounted to slide on the first and a third is mounted to slide on the second.

According to a particular embodiment, each three-dimensional adjustment system is common for two fixing bases intended to receive two adjacent fixing points of the same panel.

Advantageously, the three-dimensional adjustment system comprises an adaptation beam which bears a fixing base at each of its ends, two adjustment carriages disposed one on top of the other relative to the direction of the axis X, and translationally mobile along the tower parallel to the axis X, for each adjustment carriage, an adaptation arm of which one end is mounted to rotate freely about a horizontal axis on the adjustment carriage and of which the other end is mounted to rotate freely about a horizontal axis on the adaptation beam, for each fixing base, a vertical adjuster on which the fixing base is fixed and which ensures a vertical adjustment, a first secondary cross table on which the vertical adjuster is mounted, which is motorized and which ensures a translation in a first horizontal direction, a second secondary cross table on which the first secondary cross table is mounted, which is motorized and which ensures a translation in a second horizontal direction at right angles to the first horizontal direction, and a main cross table that is motorized and mounted between the adaptation beam and the second secondary cross table and which ensures a horizontal displacement.

Advantageously, the tower comprises at least two levels, and one level has, at the level of the joint between two adjacent panels, a retractable platform.

Advantageously, the tower comprises at least two levels, each level having a deck positioned facing a joining line between two panels, and the tower has, for each deck, a retractable platform.

Advantageously, the assembly comprises a fixing head intended to fix two adjacent panels to one another, and the support tower comprises guiding rails fixed to the tower and along which the fixing head is displaced.

Advantageously, the support tower comprises a rocker, a securing base and moving mechanism, the seat is mounted to be rotationally mobile about the axis X on the rocker, the rocker is mounted to be rotationally mobile on the securing base about a horizontal rocking axis, and the moving mechanism(s) is/are provided and configured to displace the rocker about the rocking axis.

Advantageously, the panel is equipped with profiled elements drilled with holes, the fixing of the panel to the support system is ensured by a plurality of fixing systems, each fixing system comprises a shoe fixed to the support system, an actuator fixed to the shoe and comprising a retractable block, a bearing arm mounted to be rotationally mobile on the shoe between a bearing position and a separated position and an actuation system intended to rock the bearing arm, the actuator bears against a face of the profiled element and the block in extended position penetrates into a hole, and the bearing arm is rocked into bearing position to bear against the other face of the profiled element.

Advantageously, the support system comprises two support subsystems, each support subsystem comprises two main fittings fixed to the panel, one central fitting fixed between the two main fittings and two lateral fittings where each is fixed to one of the main fittings on the side opposite the central fitting, and each lateral fitting and the central fitting comprise at least one foot bearing against the internal face of the panel and that can be adjusted into position at right angles to the internal face.

The disclosure herein also proposes a production line for fuselage sections of an aircraft comprising:
- a storage station where panels used in the production of sections are stored, where each panel is fixed onto a support system of an assembly according to the preceding variant,
- a preparation station comprising a plurality of stands, each stand being designed to support a support tower of the assembly according to the preceding variant,
- a handling robot that moves between the storage station and the preparation station in order to position each of the at least two support systems and its panel on the support tower,
- an assembly station where the panels mounted on the support tower are fixed to one another to form a section,
- a rocking station comprising structure for rocking the support tower and the section that it bears, from the vertical position to the horizontal position so as to bring the axis of the section into horizontal position,
- a reception station comprising at least one cradle which receives the section when it is rocked by the rocking station, and
- a transfer station comprising a transfer path and a pallet truck which travels on the transfer path and which is designed to transport the support tower from a stand to the assembly station, then from the assembly station to the rocking station.

The subject matter herein also discloses a production line for fuselage sections of an aircraft comprising:
- a storage station where panels used in the production of sections are stored, where each panel is fixed to a support system of an assembly according to the preceding variant,
- a transfer zone where the panels are brought from the storage station on a transport carriage,
- a preparation station where each panel is fixed to a tower of an assembly according to the preceding variant, and which comprises a rocking system which makes it possible to rock the transport carriage from a horizontal position to a vertical position facing the tower to be fixed thereto,
- an assembly station where the panels mounted on the support tower are fixed to one another to form a section,
- a rocking station comprising structure for rocking the support tower and the section that it bears, from the vertical position to the horizontal position so as to bring the axis of the section into horizontal position, and
- a reception station comprising at least one cradle which receives the section when it is rocked by the rocking station.

BRIEF DESCRIPTION OF THE DRAWINGS

The abovementioned features of the disclosure herein, and others, will become more clearly apparent on reading the following description of an exemplary embodiment, the description being given in relation to the attached drawings, in which.

DETAILED DESCRIPTION

Figure 1:
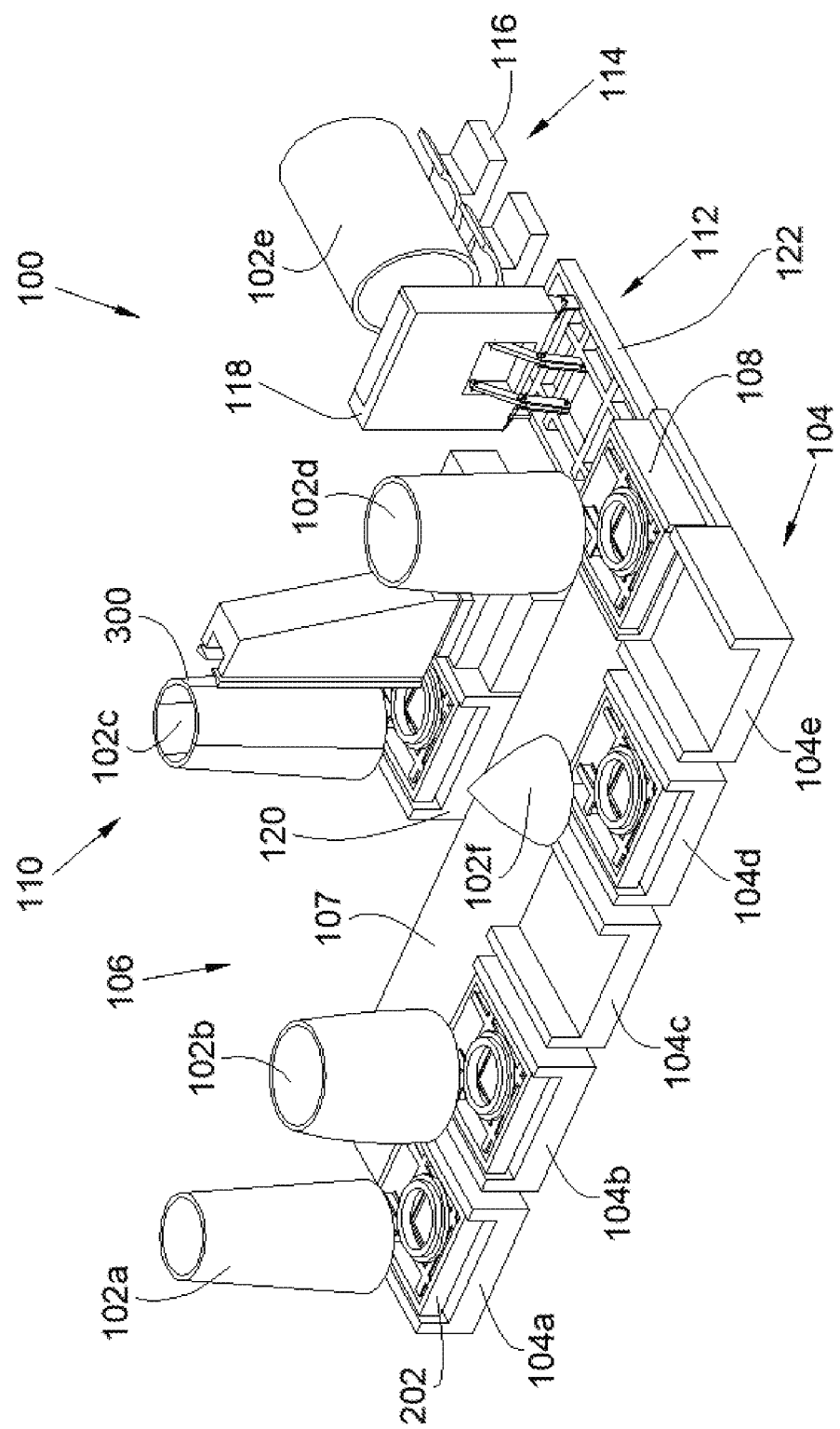
FIG. 1 is a perspective view of a production line for fuselage sections of an aircraft according to an embodiment of the disclosure herein.
Figure 2:
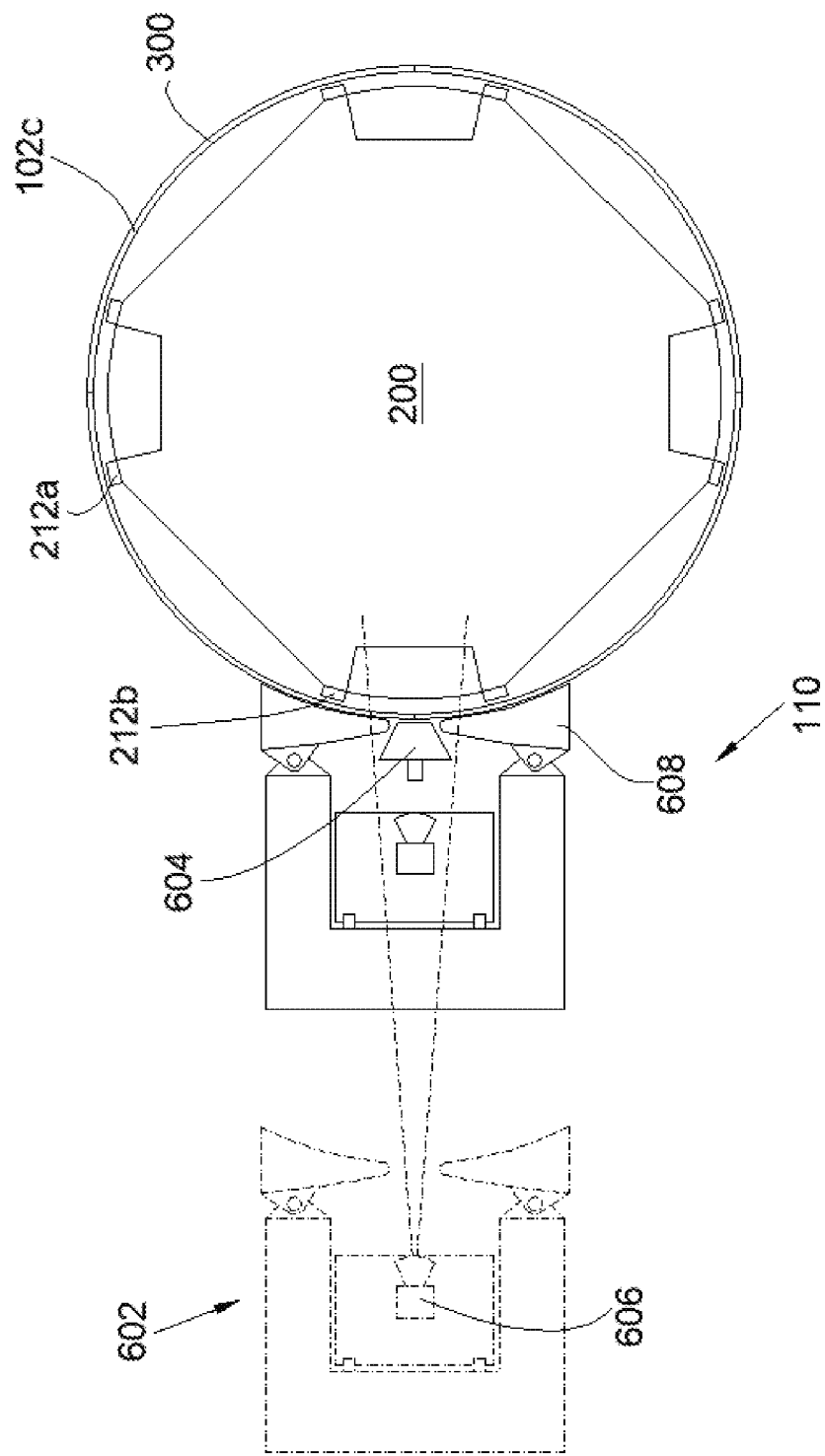
FIG. 2 is a plan view of a step of production of a section of the fuselage for the production line of FIG. 1.
Figure 3:
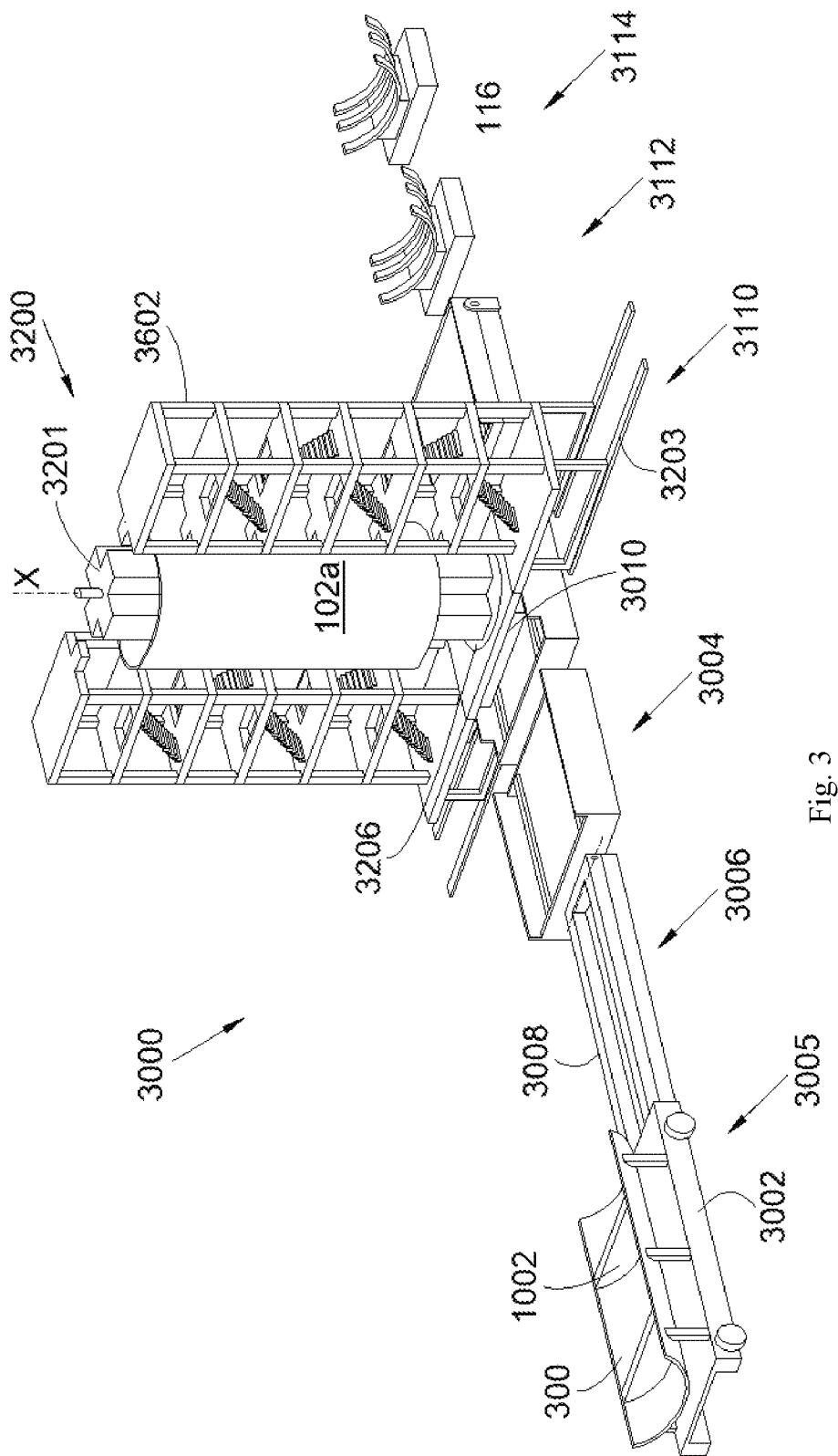
FIG. 3 is a perspective view of a production line for fuselage sections of an aircraft according to another embodiment of the disclosure herein.
Figure 4:
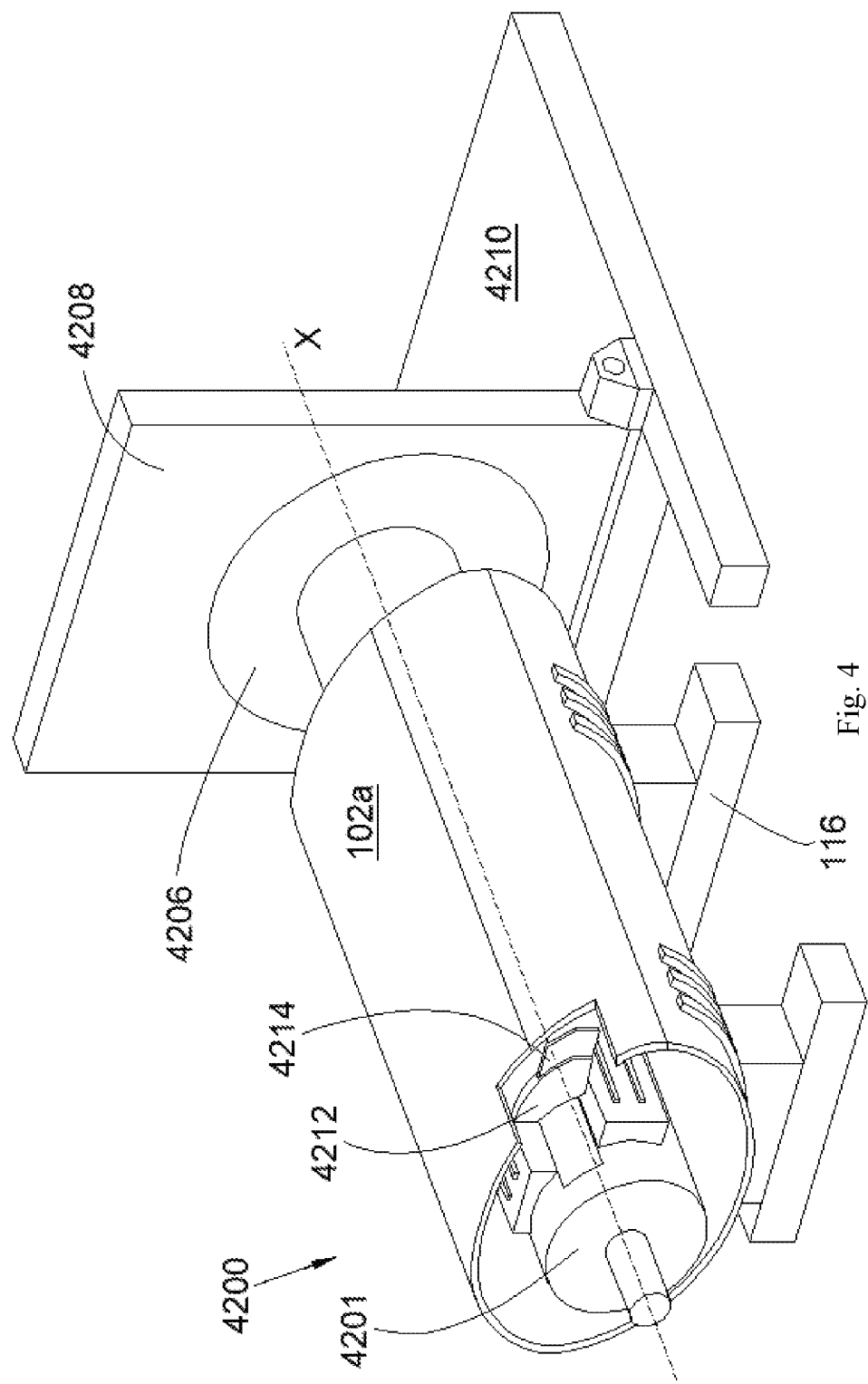
FIG. 4 is a perspective view of a step of production of a section of the fuselage for the production line of FIG. 3.

FIG. 1 shows a production line 100 according to an embodiment of the disclosure herein which is designed to manufacture at least one section 102a-f of a fuselage of an aircraft. FIG. 2 shows a plan view of an assembly station 110 of the production line 100, FIG. 3 shows a production line 3000 according to another embodiment which is designed to manufacture a section 102a of a fuselage of an aircraft. FIG. 4 shows a variant of a step of production of the production line 3000 of FIG. 3.

In each of the embodiments, the sections 102a-e are intermediate sections of the fuselage, but the disclosure herein applies equally to the nose of the fuselage represented by the section 102f in FIG. 1. Each section 102a-f has, overall, the form of a cylinder about an axis. Conventionally, the sectional form of the section 102a-f is circular or ovoid.

Each production line 100, 3000 comprises a storage station (not represented) where four panels used in the production of sections 102a-f are stored. The disclosure herein is more particularly described for four panels per section 102a-f, but, generally, there can be at least two thereof.

Each production line 100, 3000 comprises a support tower 200, 3200, 4200 which can take different architectures.

Figure 9:
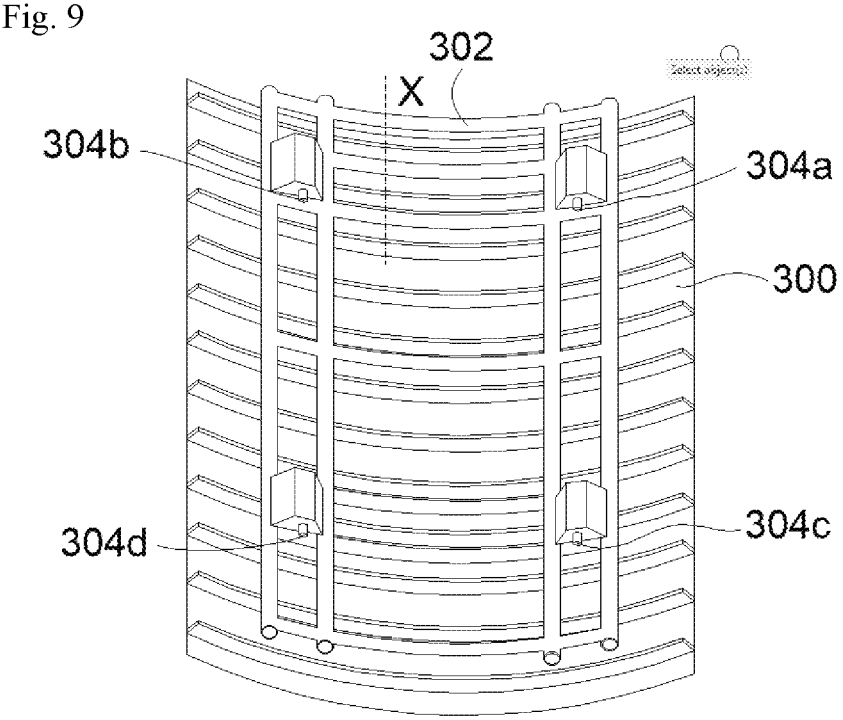
FIG. 9 is a perspective view of a panel of a section equipped with a support system according to a particular embodiment.
Figure 10:
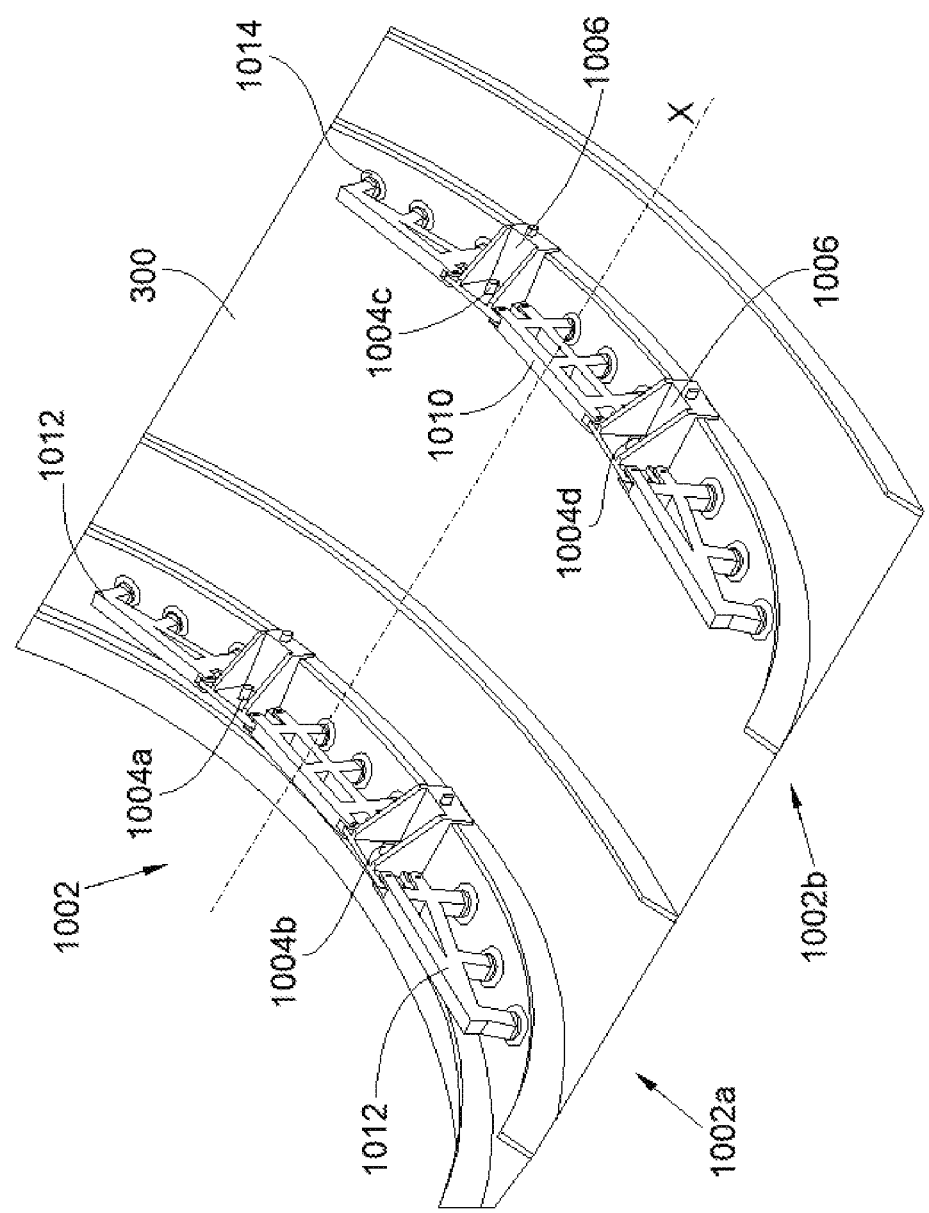
FIG. 10 is a perspective view of a panel of a section equipped with a support system according to another particular embodiment.

An assembly according to the disclosure herein comprises the support tower 200, 3200, 4200 and four support systems 302, 1002 which are described below on the basis of FIGS. 9 and 10. More generally, there are as many support systems 302, 1002 as there are panels, that is to say at least two support systems 302, 1002. FIGS. 9 and 10 show two panels 300 with two examples of support systems 302, 1002.

Each support system 302, 1002 bears a panel 300 of a section 102a-f and comprises four fixing points 304a-d, 1004a-d.

Each support tower 200, 3200, 4200 comprises:
- a tower 201, 3201, 4201 which extends along an axis X,
- a seat 206, 3206, 4206 on which the tower 201, 3201, 4201 is mounted and where the seat 206, 3206, 4206 is rotationally mobile about the axis X, and
- for each fixing point 304a-d, 1004a-d, a fixing base 212a-d mounted on a three-dimensional adjustment system 214, 814 mounted on the tower 201, 3201, 4201 and motorized to displace the fixing base 212a-d in two horizontal directions and one vertical direction, where each fixing point 304a-d, 1004a-d and associated fixing base 212a-d can be locked with one another to ensure the fixing of one with the other, and can be unlocked to allow them to be separated.

For each fixing point 304*a-d*, 1004*a-d*, the tower 201, 3201, 4201 has a fixing base 212*a-d* to which the fixing point 304*a-d*, 1004*a-d* is separably fixed, that is to say that the fixing can be released.

Each panel 300 is equipped with a support system 302, 1002 to which the panel 300 is fixed. Each support system 302, 1002 comprises four fixing points 304*a-d*, 1004*a-d*.

In the embodiment of FIG. 9, the support system 302 takes the form of a frame fixed inside the curvature of the panel 300 by fixing systems.

In the embodiment of FIG. 10, the support system 1002 comprises two support subsystems 1002*a-b*, each being fixed to an end of the panel 300 and inside the curvature of the panel 300. Each support subsystem 1002*a-b* comprises two main fittings 1006 where each is fixed to the panel 300 by a fixing system.

Each support subsystem 1002*a-b* also comprises a central fitting 1010 which is fixed between the two main fittings 1006, and two lateral fittings 1012 where each lateral fitting 1012 is fixed to one of the main fittings 1006 on the side opposite the central fitting 1010.

Each support subsystem 1002*a-b* comprises, in succession from one end to the other, a lateral fitting 1012, a main fitting 1006, a central fitting 1010, a main fitting 1006 and a lateral fitting 1012.

Each lateral fitting 1012 and the central fitting 1010 here take the form of a network of beams which are arranged in a plane at right angles to the axis X of curvature of the panel 300.

Each lateral fitting 1012 and the central fitting 1010 also comprise at least one foot 1014 which is mounted on the fitting 1010, 1012 and which comes to bear against the internal face of the panel 300 and which can be adjusted in position at right angles to the internal face. The adjustment of the feet 1014 makes it possible to guarantee the optimal curvature of the panel 300 during the various assembly operations. The adjustment of each foot 1014 is performed using any appropriate motorized systems controlled by a control unit, for example a control unit of the support system 302, 1002.

Each support system 302 can be implemented equally well with each tower 201, 3201, 4201.

Figure 5:
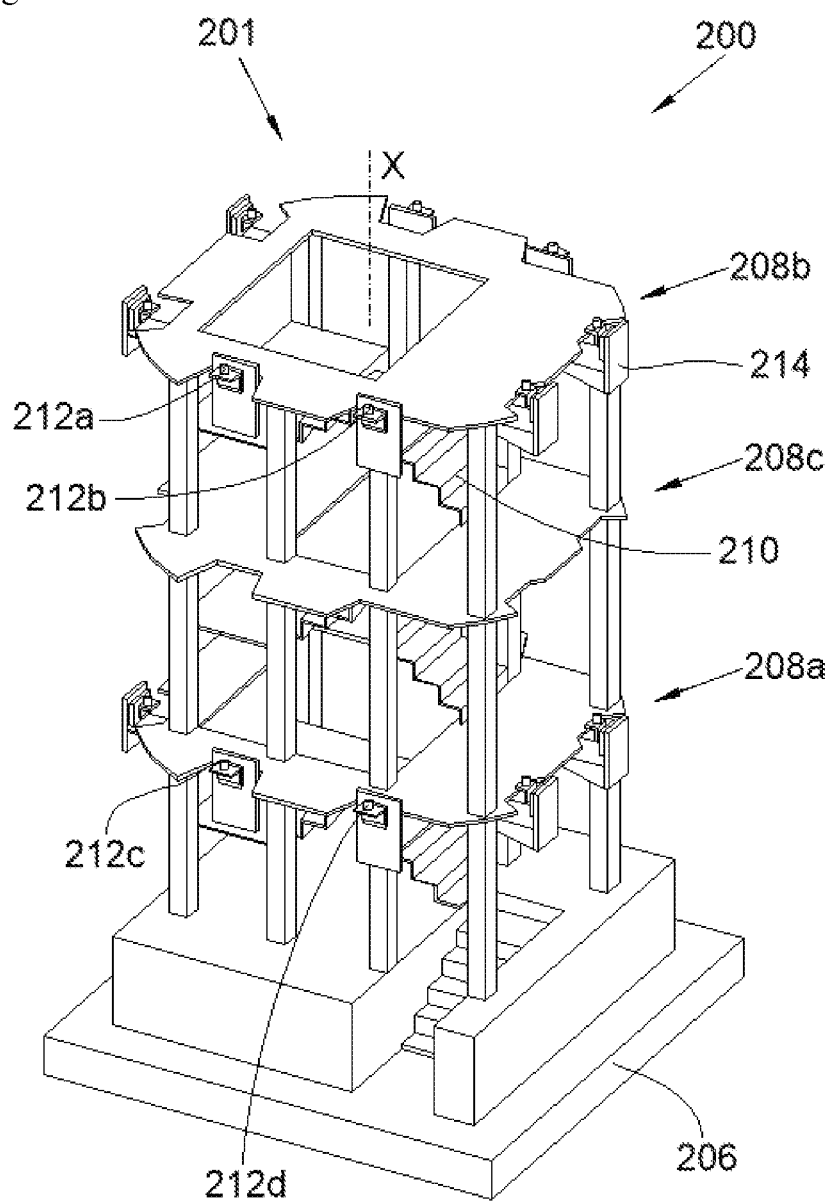
FIG. 5 is a perspective view of a support tower according to a particular embodiment.

FIG. 5 shows a support tower 200 according to a particular embodiment and which is implemented in the production line 100 of FIG. 1. The support tower 200 comprises a pallet 202 (visible in FIG. 1) and a seat 206 mounted to be rotationally mobile on the pallet 202 about the vertical axis X. The rotation of the seat 206 is performed by any appropriate motorized mechanism. FIG. 5 shows the support tower 200 without panel.

The support tower 200 comprises the tower 201 mounted on the seat 206 and which comprises at least two levels 208*a-c* (here three of them) which are served here by any appropriate access, here a central staircase 210. The number of floors depends in particular in the length of the section 102*a-e* to be produced.

Figure 6:
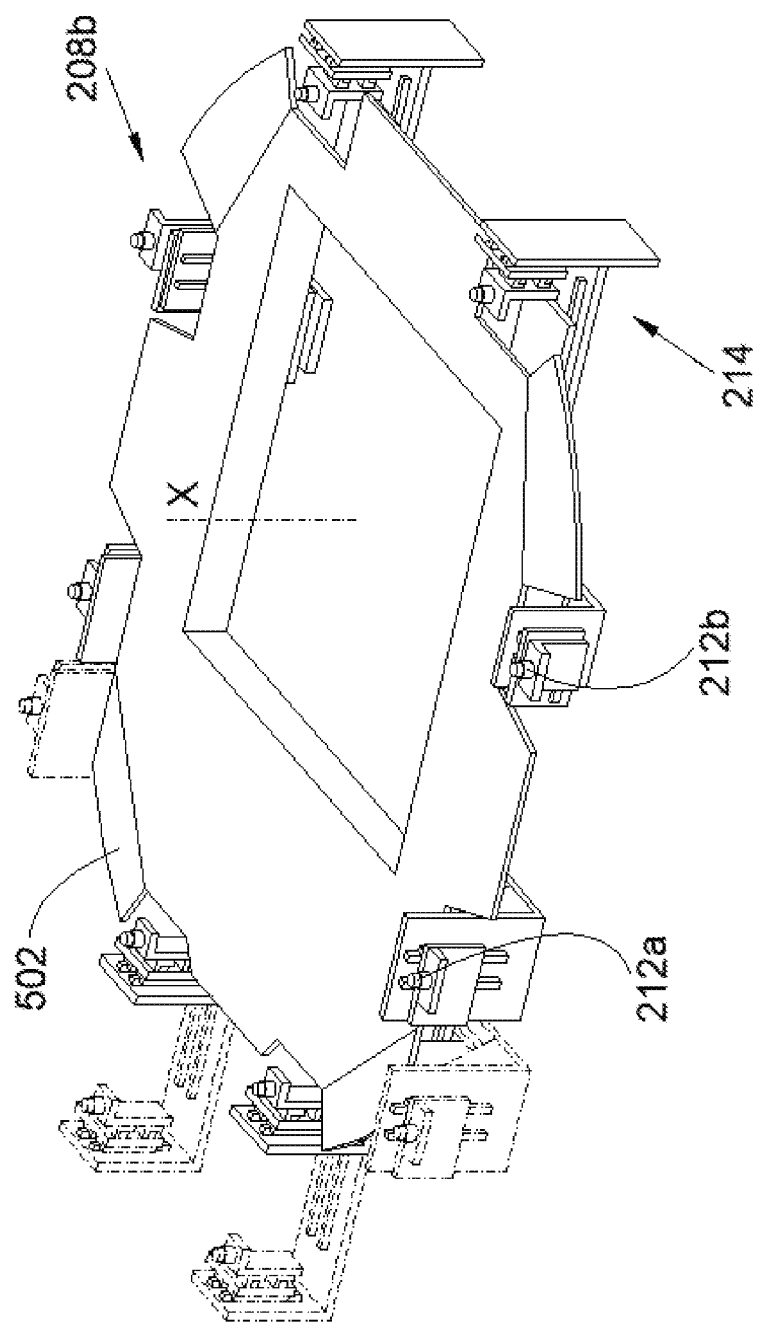
FIG. 6 is a perspective view of a level of the support tower of FIG. 5.

The tower 201 of FIG. 5 is produced here using vertical beams fixed to the seat 206 and horizontal levels 208*a-c* fixed to the beams. The sectional form of the tower 201 is, here, rectangular overall, FIG. 6 shows a level, here the level 208*b*. In the embodiment of FIG. 5 and of FIG. 6, each three-dimensional adjustment system 214 for example takes the form of three motorized cross tables of which a first is mounted to slide on the tower 201, here in a first horizontal direction, a second is mounted to slide on the first, here in a vertical direction, and a third is mounted to slide on the second, here in a second horizontal direction at right angles to the first horizontal direction.

An operator placed on the seat 206 can intervene on the panels 300 to the lowest level 208*a*. An operator placed on the highest level 208*b* can intervene on the panels 300 above this level 208*b*. The lowest level 208*a* and the intermediate level 208*c* allow an operator placed on these levels 208*a* and 208*c* to intervene on the panels 300 between these levels.

Depending on the geometry of each level 208*a-c* and when the space between the level 208*a-c* and the panel 300 is insufficient, the level 208*a-c* can comprise, at the join between two adjacent panels 300, a retractable platform 502. When the platform 502 is retracted, the space between the level 208*a-c* and the panel 300 is enlarged and an operator placed on the seat 206 or on one of the lower levels 208*a*, 208*c* can intervene over all the height to the next level. This platform 502 is for example mounted on hinges and can therefore be pivoted.

To make it possible to produce circular sections and ovoid sections, four of the eight fixing bases 212*a-b* of a level 208*b* can be displaced over a relative significant horizontal distance. These four fixing bases 212*a-b* are represented by chain-dotted lines for the position corresponding to an ovoid section and by continuous lines for a circular section. As specified above, the displacement of each fixing base 212*a-b* is performed by motorized runner systems. The four fixing bases 212*a-b* concerned are the fixing bases 212*a-b* which are located at the part of the section 102*a-f* corresponding to the bottom part of the fuselage.

Each fixing base 212*a-d* is mounted on a three-dimensional adjustment system 214 which makes it possible to displace the fixing base 212*a-d* in the three directions in space, that is to say two horizontal directions and one vertical direction. Each three-dimensional adjustment system 214 is mounted on the tower 201 in an appropriate position.

Each three-dimensional adjustment system 214 is motorized so as to displace the associated fixing base 212*a-d*.

As there are, here, four panels 300 per section 102*a-f*, there are therefore, here, sixteen fixing bases 212*a-d* per tower 201.

When a panel 300 and a support system 302 have to be placed on the tower 201, the geometrical data relating to this panel 300 and to this support system 302 are transmitted to a control unit of the tower 201 which positions each three-dimensional adjustment system 214 according to the geometrical data. Thus, in the placement of each panel 300 and of the support system 302, each fixing base 212*a-d* is set in order to correspond to the associated fixing point 304*a-d*. The displacement of each three-dimensional adjustment system 214 can be performed by any appropriate motorized mechanism, such as a motor, a cylinder, etc.

Obviously, in the case of a drift of the tolerances, a manual or automatic adjustment of each fixing base 212*a-d* is possible. The automatic adjustment can be based for example on an analysis of images.

In the embodiment of the disclosure herein presented here, two fixing bases 212*a-b* are disposed at the highest level 208*b* and two fixing bases 212*c-d* are disposed at the lowest level 208*a*. Here, there are four fixing bases 212*a-d* per face of the tower 201.

The tower 201 also comprises a control unit and each three-dimensional adjustment system 214 is controlled by the control unit.

When the panel 300 is placed on the tower 201, the fixing bases 212a-d and the fixing points 304a-d are locked by the control unit to hold the panel 300 in place. Each fixing point 304a-d and the associated fixing base 212a-d can thus be locked with one another to ensure the fixing of one with the other and can be unlocked to allow them to be separated.

The fixing mode between a fixing base 212a-d and the associated fixing point 304a-d can consist of or comprise any unlockable attachment system that makes it possible to fix the fixing point 304a-d to the fixing base 212a-d and for it to be released on command. It can be, for example, a magnetic system, a ball attachment system (such as the system from the company Jergens® known by the name "Zero Point Mounting System", for example), etc.

FIG. 4 shows a support tower 4200 according to a particular embodiment and which is implemented in the production line 3000 of FIG. 3. The differences with the support tower 200 of FIG. 5 lie primarily in the architecture of the support tower 4200.

Each fixing base and each three-dimensional adjustment system can be similar to those of the support tower 200 or different as is explained below.

The support tower 4200 comprises a rocker 4208, a securing base 4210 and moving mechanism(s). The seat 4206 is mounted to be rotationally mobile about the axis X on the rocker 4208. The rocker 4208 is mounted to be rotationally mobile on the securing base 4210 resting on the ground, about a horizontal rocking axis. The moving mechanisms are designed to displace the rocker 4208 about the rocking axis in order to place the rocker 4208 alternately from the horizontal position to the vertical position and vice versa.

The rotation of the seat 4206 is performed by any appropriate motorized mechanism.

The tower 4201 mounted on the seat 4206 comprises at least two levels (here, only the last level is visible) which are served by any appropriate access, for example a central staircase. The number of floors depends in particular on the length of the section 102a to be produced.

The tower 4201 of FIG. 4 here has an overall cylindrical form and is capped. Each level has a deck 4212 that can be accessed by a door and to which an operator can come to intervene on the panels 300. Each deck 4212 is positioned facing a joining line between two panels 300.

Depending on the geometry of each deck 4212, the tower 4201 has, for each deck 4212, a platform 4214 which is retractable into the deck 4212 and which thus makes it possible to extend the deck 4212. When the platform 4214 is deployed, the operator can approach the panel 300. This platform 4214 is for example mounted on runners.

Figure 7:
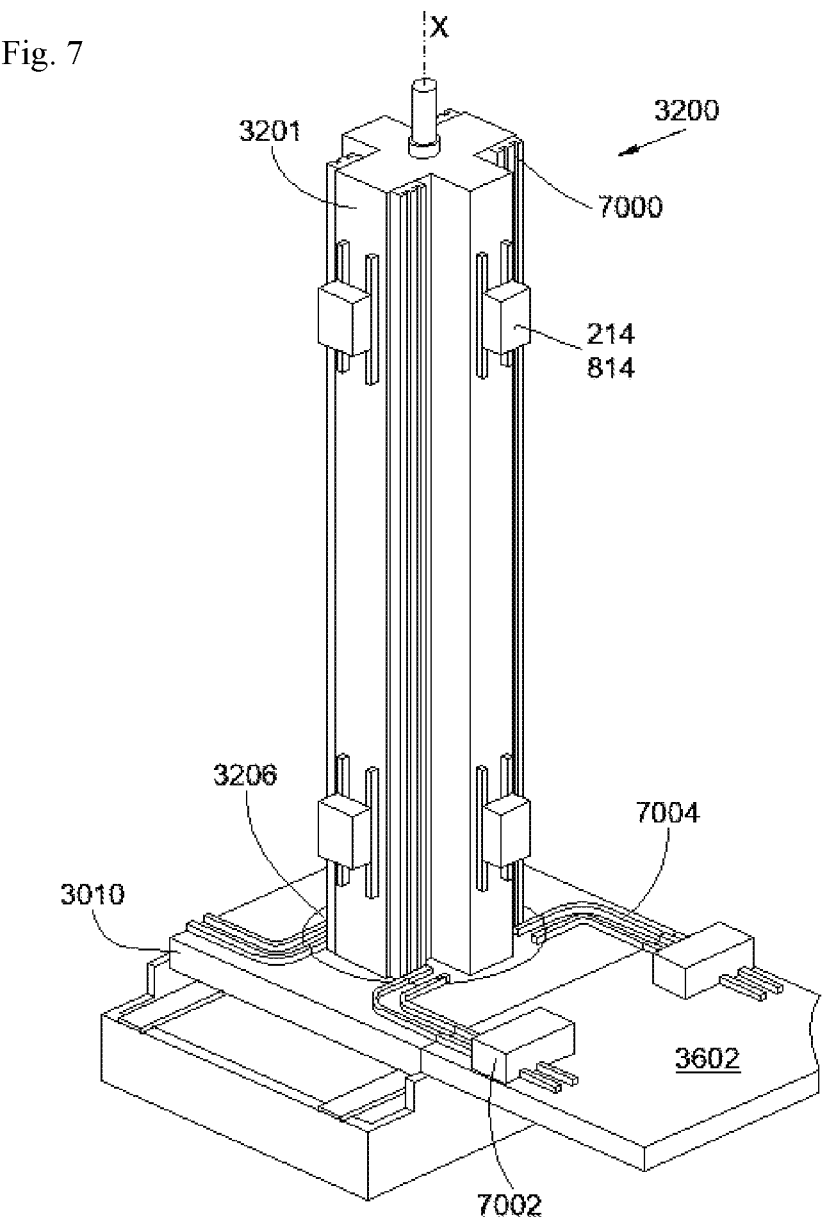
FIG. 7 is a perspective view of a support tower according to another particular embodiment.

FIG. 7 shows a support tower 3200 according to a particular embodiment and which is implemented in the production line 3000 of FIG. 3. The differences with the support tower 200 of FIG. 5 lie primarily in the architecture of the support tower 3200.

The support tower 3200 comprises a pallet 3010 and a seat 3206 mounted to be rotationally mobile on the pallet 3010 about the vertical axis X. The rotation of the seat 3206 is performed by any appropriate motorized mechanism, FIG. 7 shows the support tower 3200 without panels.

The support tower 3200 comprises the tower 3201, which is particularly designed to be implemented with automation, that is to say, that no levels are provided to allow an operator to be positioned. Nevertheless, it is possible to provide levels that can be accessed from inside the tower 201 and which allow maintenance of the support tower 3200.

Each fixing base and each three-dimensional adjustment system can be similar to those of the support tower 200 or different as is explained below.

The tower 3201 of FIG. 7 is, here, overall cylindrical and is capped.

Figure 8:
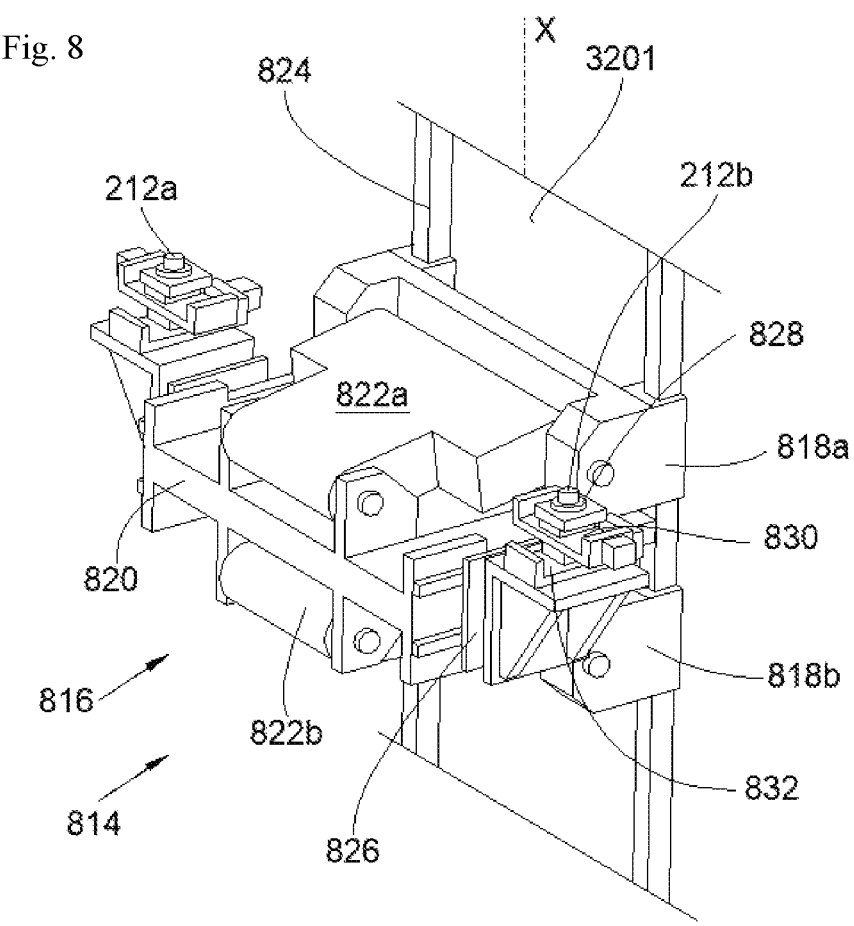
FIG. 8 is a perspective view of a three-dimensional adjustment system according to a particular embodiment.

Each fixing base 212a-b and each three-dimensional adjustment system 214, 814 are represented here schematically and they can alternatively take the form of the elements shown in FIG. 5 or in FIG. 8, FIG. 8 shows a three-dimensional adjustment system 814 according to another embodiment which can be implemented equally well with all the support towers 200, 3200, 4200 and it will be described here relative to the tower 3201. The three-dimensional adjustment system 814 is mounted to slide vertically along the tower 3201.

Each three-dimensional adjustment system 814 comprises an adaptation system 816 which bears two fixing bases 212a-b where the two fixing bases 212a-b are intended to receive two adjacent fixing points 304a-b, 1004a-b of the same panel 300. In other words, for two fixing bases 212a-b intended to receive two adjacent fixing points 304a-b, 1004a-b of the same panel 300, the three-dimensional adjustment system 814 is common.

The adaptation system 816 makes it possible to separate or bring together the two fixing points 304a-b of the tower 3201 in order to adapt the position of the two fixing bases 212a-b according to whether the section is circular or ovoid.

The adaptation system 816 comprises an adaptation beam 820 which is overall horizontal and which bears a fixing base 212a-b at each of its ends.

The adaptation system 816 comprises two adjustment carriages 818a-b which are disposed one on top of the other relative to the direction of the axis X. Each adjustment carriage 818a-b is mounted to be translationally mobile along the tower 3201 parallel to the axis X, that is to say vertically.

The adaptation system 816 comprises, for each adjustment carriage 818a-b, an adaptation arm 822a-b of which one end is mounted to rotate freely about a horizontal axis on the adjustment carriage 818a-b and of which the other end is mounted to rotate freely about a horizontal axis on the adaptation beam 820.

Thus, when the adjustment carriages 818a-b are separated from one another, the adaptation beam 820 approaches the tower 3201, and vice versa.

Each adjustment carriage 818a-b is mounted here on two rails 824 along which it is displaced via a motorized system such as a motor for example provided with gearing which meshes with a rack parallel to the rails 824.

Each three-dimensional adjustment system 814 also comprises, for each fixing base 212a-b, a vertical adjuster 828, such as a cylinder for example, to which the fixing base 212a-b is fixed and which ensures a vertical adjustment of the position of the fixing base 212a-b, a first secondary cross table 830 on which the vertical adjuster 828 is mounted, which is motorized and which ensures a translation in a first horizontal direction of the fixing base 212a-b, and a second secondary cross table 832 on which the first secondary cross table 830 is mounted, which is motorized and which ensures a translation in a second horizontal direction of the fixing base 212a-b at right angles to the first horizontal direction.

Each three-dimensional adjustment system 814 comprises, for each fixing base 212a-b, a main cross table 826 which is motorized and which is mounted between the adaptation beam 820 and the second secondary cross table 832 in order to ensure a horizontal displacement of the fixing base 212a-b in a direction which makes it possible to separate the fixing base 212a-b from the tower 3201 or bring them closer together. This main cross table 826 makes it possible, by a displacement over a significant distance, to separate the fixing base 212a-b from the fixing point 304a-b, 1004a-b when they are separated by the unlocking thereof.

FIG. 1 shows the production line 100 which is described with a support tower 200 according to FIG. 5, but which can also be implemented with a support tower 3200 according to FIG. 7.

The production line 100 comprises a preparation station 104 comprising a plurality of stands 104a-e. Each stand 104a-e is designed to receive a support tower 200 (a part of which is not represented in FIG. 1) where the support tower 200 supports each panel of a section 102a-f. The stands 104a-e are, here, aligned in a main direction. Each support tower 200 is erected vertically so as to produce a section 102a-f positioned vertically, that is to say that the axis of the section 102a-f is oriented vertically.

The production line 100 comprises a transfer station 106 comprising a transfer path 107 which extends along the stands 104a-e and a pallet truck 108 which travels on the transfer path 107. All the stands 104a-e are, here, aligned on one side of the transfer path 107.

A pallet truck 108 is provided to take a pallet 202 from a support tower 200 of a stand 104a-e to transport it to another station described below.

The production line 100 comprises an assembly station 110 where panels 300 mounted on a support tower 200 are fixed to one another to form a section 102a-f. The transition from a stand 104a-e to the assembly station 110 is performed using the pallet truck 108 travelling on the transfer path 107.

The production line 100 comprises a rocking station 112 comprising structure for rocking the pallet 202 and therefore the support tower 200 and the section 102a-f that it bears are rocked from the vertical position to the horizontal position so as to bring the axis of the section 102a-f into horizontal position. The transition from the assembly station 110 to the rocking station 112 is performed using the pallet truck 108 travelling on the transfer path 107.

The assembly station 110 and the rocking station 112 are disposed on the other side of the transfer path 107 relative to the stands 104a-e. Obviously, a different positioning is also possible.

The production line 100 comprises a reception station 114 comprising at least one cradle 116 which receives the section 102a-f when it is rocked by the rocking station 112.

The production line 100 comprises a handling robot (not represented) which moves between the storage station and the preparation station 104 in order to position each of the four support systems 302, 1002 and its panel 300 on the support tower 200 concerned. When a panel 300 has to be positioned on the support tower 200, the panel 300 is identified by the control unit of the tower 201 by any appropriate mechanism, such as, for example, a bar code, a chip, etc.

From this identification, the geometrical data of the panel 300 and of the support system 302, 1002 are known and the fixing bases 212a-d are positioned by the three-dimensional adjustment systems 214 according to these geometrical data.

The handling robot can then take the panel 300 and the support system 302, 1002 and position them on the tower 201 by matching the fixing points 304a-d, 1004a-d and the fixing bases 212a-d, which are then locked. The support tower 200 is then pivoted about the vertical axis X to present another side in order to position a second panel 300, and so on for the last two panels 300.

When the section 102a-f is on the cradle 116, each fixing system 500 is unlocked to release the section 102a-f from the support system 302, 1002 and it can then be transported to a subsequent workstation, for example to fix the section 102a-f to another section in order to produce the fuselage. The fixing points 304a-d, 1004a-d and the fixing bases 212a-d are unlocked in order to release each support system 302, 1002 from the support tower 200, which can then be straightened vertically and redirected to a stand 104a-e to receive new panels 300.

Such a production line 100 thus makes it possible to produce several sections 102a-f, in parallel, since it is possible to position the panels of different sections 102a-f on the support towers 200 of each stand 104a-e, while the fixing of the panels of a section 102a-f is finalized at the assembly station 110. Furthermore, the vertical position of the sections 102a-f allows for a space saving on the ground.

In the embodiment of the disclosure herein presented in FIG. 1, the assembly station 110 comprises a base 120 designed to receive the pallet 202 from the pallet truck 108.

In the embodiment of the disclosure herein presented in FIG. 1, the rocking station 112 comprises a rocking base 118 which is designed to receive the pallet 202 from the pallet truck 108 and which comprises appropriate mechanism(s) to provide a rocking function, such as arms and cylinders for example.

The transition of the pallet 202 from a stand 104a-e, from the base 120 or from the rocking base 118 to the pallet truck 108 is performed in a conventional way. For example, it is possible to provide rollers under the pallet 202 and a driving system of motorized chain type to displace the pallet truck 108, or motorized wheels under the pallet 202.

The rocking base 118 is mounted on a chassis 122. The chassis 122 or the cradle 116 are horizontally mobile in order to ensure a good positioning of the section 102e on the cradle 116 in laid-down position.

The displacement is performed by any appropriate mechanism, such as motorized wheels for example. The displacement is determined relative to the geometrical data of the section 102e.

To this end, the reception station 114 comprises a control unit which controls the positioning of the chassis 122 or of the cradle 116 according to the geometrical data relating to the section 102e.

FIG. 2 shows a plan view of the assembly station 110. The assembly station 110 comprises a column 602 which is mobile by horizontal translation between a separated position and a close position. In separated position (chain-dotted lines), the column 602 is at a distance from the section 102c and, in close position (continuous lines), the column 602 is against the section 102c.

The separated position allows the transition and the movement of the section 102c, the close position allows the panels 300 to be fixed to one another. To this end, the column 602 bears a fixing head 604 which is vertically mobile and which is intended to fix two adjacent panels 300 to one another along a joining line, when the column 602 is in close position. To this end, the fixing head 604 is mounted on a lift which rises and which descends in the column, along the joining line.

The column 602 comes against the two adjacent panels 300 to stabilize them during the action of the fixing head 604. The fixing head 604 ensures the fixing from the outside of the section 102c while the operators ensure fixing from the inside through the presence of the support tower 200.

The fixing head 604 can take different forms, it can be a welding head, a riveting head, etc.

When the column 602 is in close position, the fixing head 604 acts along the joining line, when the work of the fixing head 604 along the joining line is finished, the column 602 is displaced to the separated position. The support tower 200 is then pivoted by an angle α corresponding to the next panel 300 and to thus bring another joining line into position, and the column 602 is once again placed in close position to allow the action of the fixing head 604, and so on for each joining line.

Because of the tolerances, it may be that the joining line between two adjacent panels 300 is not vertical, and it is then necessary to assess the exact position of the joining line to allow the fixing head 604 to be positioned correctly before it is used.

To this end, the column 602 has a control unit and bears a camera 606 which is mounted to be vertically mobile, for example on the preceding lift, and the lens of which is oriented towards the joining line. Here, in separated position, the camera 606 is displaced vertically and films the zone around the joining line. The images that are thus captured are transmitted to the control unit of the column 602 which, by visual recognition, determines the exact position of the joining line heightwise. Such an analysis is performed for each joining line.

The fixing head 604 is mounted on a slide that is mobile by horizontal translation on the lift, in particular tangentially to the panels 300 at the joining line. The slide is motorized and, based on the joining line position information, the control unit of the column 602 controls the positioning of the slide in order to position the fixing head 604 facing the joining line and do so over all the height of the section 102c. The positions of the fixing head 604 over the height of the section 102c are thus determined by analysis of the images of the joining line captured by the camera 606.

To ensure that the column 602 bears correctly on the section 102c in close position, the column 602 bears two skids 608 mounted articulated about vertical axes, where each skid 608 comes to bear on one side of the joining line in close position.

Each skid 608 has an arched bearing surface to come against the panel 300.

All the control units are connected to one another to allow a transfer of information between them.

FIG. 3 shows another production line 3000 which comprises a storage station (not represented) where four panels 300 used in the production of sections 102a-f are stored. The disclosure herein is more particularly described for four panels per section 102a-f, but, generally, there can be at least two thereof.

Likewise, the production line 3000 is more particularly described with the support tower 3200 according to FIG. 7, but it can also be implemented with a support tower 200 according to FIG. 5.

The production line (3000) comprises a transfer zone 3005 where the panels 300 are brought from the storage station on a transport carriage 3002 with the support system (here 1002).

The production line 3000 also comprises a preparation station 3004 where each panel 300 is fixed to the tower 3201. The preparation station 3004 comprises a rocking system 3006 which makes it possible to rock the transport carriage 3002 from a horizontal position to a vertical position. To this end, the rocking system 3006 comprises a rocking chassis 3008 which is rotationally mobile about a horizontal axis and displacement mechanism such as cylinders for example which displace the rocking chassis 3008. The preparation station 3004 makes it possible to position and fix each of the four support systems 1002 and its panel 300 to the tower 3201.

After the fixing of a panel 300, the rocking system 3006 is lowered back and the transport carriage 3002 is discharged to allow space for a new loaded transport carriage 3002. The tower 3201 then performs a rotation to present another face and the rocking system 3006 rocks once again to deposit the new panel 300.

In this embodiment, the tower 3201 also has a pallet 3010 which moves between the different stations through the use of a pallet truck of the production line 3000. The pallet truck is provided to take the pallet 3010 from the support tower 3200 and transport it to another station described below.

The production line 3000 comprises an assembly station 3110 where panels 300 mounted on the support tower 3200 are fixed to one another to form a section 102a.

The production line 3000 comprises a rocking station 3112 comprising structure for rocking the pallet and therefore the support tower 3200 and the section 102a that it bears are rocked from the vertical position to the horizontal position so as to bring the axis of the section 102a into a horizontal position. The rocking station 3112 is similar to the rocking station 112 of FIG. 1.

The preparation station 3004, the assembly station 3110 and the rocking station 3112 are disposed in line to facilitate the implementation and limit the footprint. Obviously, a different positioning is also possible.

The production line 3000 comprises a reception station 3114 comprising at least one cradle 116 which receives the section 102a when it is rocked by the rocking station 3112.

As for the production line 100 of FIG. 1, the assembly station 3110 comprises at least one column 3602 disposed on the side of the support tower 3200 and which is mobile by horizontal translation between a separated position in which it is away from the section 102a and a close position in which it is close to the section 102a. To this end, each column 3602 is mounted on rails 3203. In the embodiment of FIG. 3, there are two columns 3602 disposed on either side of the support tower 3200.

The separated position allows the transition and the movement of the section 102a, the close position allows the panels 300 to be fixed to one another. To this end, each column 3602 bears a fixing head (not represented) which is vertically mobile and which is intended to fix two adjacent panels 300 to one another along a joining line, when the column 602 is in close position. To this end, the fixing head is mounted on a lift which rises and which descends along the joining line. The elements described for the columns 602 of FIG. 2 can also apply here, in particular the technology implemented by the fixing head, the adaptation according to the position of the joining line.

Depending on the case, it may be necessary to pivot the tower 3201 to fix each joining line.

Each fixing head can have a span that is sufficient to cover half the section and it is then not necessary to pivot the tower 3201 to fix all the joining lines.

FIG. 4 shows a variant of the production line 300 of FIG. 3 where the rocking system 3006 and the rocking station 3112 are provided directly by the support tower 4200.

Thus, for the preparation station 3004, the support tower 4200 is placed horizontally and a first panel 300 is brought under the tower 4201 to be fixed thereto, then the tower 4201 is displaced rotationally about the axis X and a new panel 300 is brought and fixed, and so on.

For the rocking station 3112, the support tower 4201 is rocked to deposit the section 102a on a cradle 116.

In the context of FIG. 7, where the fixing of the panels 300 to one another is performed automatically, the support tower 3200 comprises, for each joining line between two panels 300 and along the tower 3201, guiding rails 7000 which are vertical and which allow the displacement of a fixing head 7002. The displacement of the fixing head 7002 along the guiding rails 7000 is ensured by any appropriate motorized mechanism, such as a rack system for example. The guiding rails 7000 are fixed to the tower 3201.

To avoid having each fixing head 7002 remain on the tower 3201 even when the support tower 3200 is displaced from one station to another of the production line, the support tower 3201 comprises, at the pallet 3010, clearance rails 7004 which make it possible to guide the fixing head 7002 from the guiding rails 7000 to a standby position outside of the pallet 3010 and which is here disposed on the columns 3602.

Figure 11:
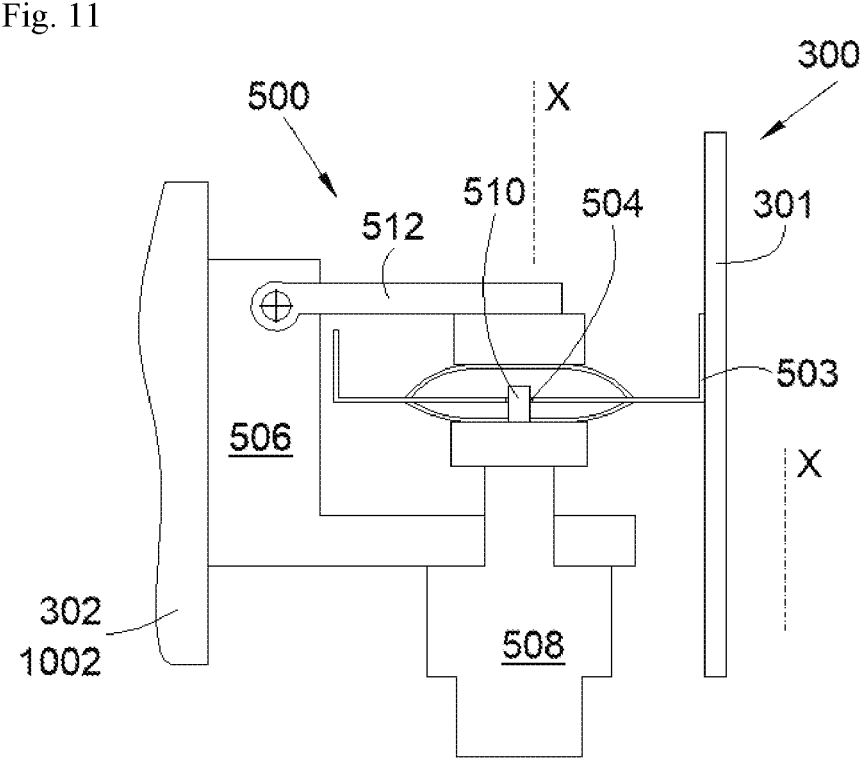
FIG. 11 is a side view of a system for fixing the support system to the panel.

FIG. 11 shows a cross section of an example of a fixing system 500 which makes it possible to fix the panel 300 to the support system 302, 1002. Several fixing systems 500 are distributed between the panel 300 and the support system 302, 1002.

The panel 300 comprises a skin 301 and profiled elements 503 which are drilled with holes 504 and fixed to the internal face of the skin 301. These holes 504 are reference holes used in the production of the panel 300 and in particular in the fixing of the profiled elements 503 to the skin 301. The position of each hole is therefore known.

The fixing system 500 comprises a shoe 506 fixed to the support system 302, 1002, an actuator 508 fixed to the shoe 506 and comprising a retractable block 510 and a bearing arm 512 mounted to be rotationally mobile on the shoe 506 between a bearing position and a separated position.

The block 510 can thus take an extended position or a retracted position.

Each fixing system 500 is fixed to a profiled element 503, so that the actuator 508 bears against a face of the profiled element 503 and the block 510 in extended position penetrates into a hole 504 of the profiled element 503, the bearing arm 512 is rocked into bearing position to bear against the other face of the profiled element 503 so as to sandwich the profiled element 503.

The actuator 508 alternately makes it possible to retract or extend the block 510 and is, for example, a cylinder.

The bearing arm 512 is rocked by any appropriate actuation system, such as a motor or a pneumatic or hydraulic system.

The actuator 508 and the actuation system are controlled by a control unit, such as a control unit of the support system 302, 1002 for example.

When the support system 302, 1002 and the panel 300 have to be separated, the control unit controls the rocking of each bearing arm 512 to separate them from the profiled element 503 and the removing of each block 510 from the hole 504.

Each control unit conventionally comprises, linked by a communication bus: a processor or CPU (Central Processing Unit); a RAM memory (Random Access Memory); a ROM memory (Read-Only Memory); a storage unit such as a hard disc or a storage medium reader; at least one communication interface, for example allowing the control unit to communicate with the motors, actuators, etc.

According to another embodiment that is not represented, the seat can be mounted on a plurality of motorized wheels which ensure the displacement of the seat and therefore of the tower, and the rotation of the seat about the axis X. In this embodiment, the seat has to be relatively wide in relation to the height of the tower to ensure a good stability.

It is also possible to provide for this seat to be positioned on a rocking system to allow the assembly comprising the seat and the tower to be rocked. In this case, the rocking system comprises a fixing system which can alternately assume a fixing position in which the seat is secured to the rocking system and a free position in which the seat is detached from the rocking system.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
    a support tower; and
    at least two support systems, each support system bearing a panel of a section of an aircraft fuselage and comprising four fixing points;
    wherein the support tower comprises:
        a tower extending along an axis X;
        a seat on which the tower is mounted and which is rotationally mobile about the axis X; and
        for each fixing point, a fixing base mounted on a three-dimensional adjustment system mounted on the tower and motorized to move the fixing base in two horizontal directions and one vertical direction, in which each fixing point and the associated fixing base can be locked with one another to ensure fixing of one with the other, and can be unlocked to allow them to be separated.

2. The assembly according to claim 1, wherein each three-dimensional adjustment system comprises three motorized cross tables of which a first is mounted to slide on the tower, a second is mounted to slide on the first and a third is mounted to slide on the second.

3. The assembly according to claim 1, wherein each three-dimensional adjustment system is common for two fixing bases to receive two adjacent fixing points of the same panel.

4. The assembly according to claim 3, wherein the three-dimensional adjustment system comprises an adaptation beam which bears a fixing base at each of adaption beam ends, two adjustment carriages disposed one above another relative to a direction of the axis X, and translationally mobile along the tower parallel to the axis X, for each adjustment carriage, an adaptation arm of which one end is mounted to rotate freely about a horizontal axis on the adjustment carriage and of which another end is mounted to rotate freely about a horizontal axis on the adaptation beam, for each fixing base, a vertical adjuster on which the fixing base is fixed and which ensures a vertical adjustment, a first secondary cross table on which the vertical adjuster is mounted, which is motorized and which ensures a translation in a first horizontal direction, a second secondary cross table on which the first secondary cross table is mounted, which is motorized and which ensures a translation in a second horizontal direction at right angles to the first horizontal direction, and a main cross table that is motorized and mounted between the adaptation beam and the second secondary cross table and which ensures a horizontal displacement.

5. The assembly according to claim 1, wherein the tower comprises at least two levels, and wherein one level has, at a joint between two adjacent panels, a retractable platform.

6. The assembly according to claim 1, wherein the tower comprises at least two levels, wherein each level has a deck positioned facing a joining line between two panels, and wherein the tower has, for each deck, a retractable platform.

7. The assembly according to claim 1, comprising a fixing head to fix two adjacent panels to one another, and wherein the support tower comprises guiding rails fixed to the tower and along which the fixing head is displaced.

8. The assembly according to claim 1, wherein the support tower comprises a rocker, a securing base and a moving mechanism, wherein the seat is mounted to be rotationally mobile about the axis X on the rocker, wherein the rocker is mounted to be rotationally mobile on the securing base about a horizontal rocker axis, and wherein the moving mechanism is configured to displace the rocker about the horizontal rocker axis.

9. The assembly according to claim 1, wherein the panel is equipped with profiled elements drilled with holes, wherein fixing of the panel to the support system is ensured by a plurality of fixing systems, wherein each fixing system comprises a shoe fixed to the support system, an actuator fixed to the shoe and comprising a retractable block, a bearing arm mounted to be rotationally mobile on the shoe between a bearing position and a separated position and an actuation system intended to rock the bearing arm, wherein the actuator bears against a face of the profiled element and the block in extended position penetrates into one of the holes, and wherein the bearing arm is rocked into bearing position to bear against another face of the profiled element.

10. The assembly according to claim 1, wherein the support system comprises two support subsystems, wherein each support subsystem comprises two main fittings fixed to the panel, a central fitting fixed between the two main fittings and two lateral fittings in which each is fixed to one of the main fittings on a side opposite the central fitting, and wherein each lateral fitting and the central fitting comprise at least one foot bearing against an internal face of the panel and that can be adjusted into position at right angles to the internal face.

11. A production line for fuselage sections of an aircraft comprising:
an assembly according to claim 1;
a storage station in which panels used to manufacture sections are stored, in which each panel is fixed to a support system of the assembly;
a preparation station comprising a plurality of stands, each stand being configured to support the support tower;
a handling robot to move between the storage station and the preparation station to position each of the at least two support systems and its panel on the support tower;
an assembly station where the panels mounted on the support tower are fixed to one another to form a section;
a rocking station comprising a structure for rocking the support tower and the section that the support tower bears, from a vertical position to a horizontal position so as to bring an axis of the section into the horizontal position;
a reception station comprising at least one cradle which receives the section when it is rocked by the rocking station; and
a transfer station comprising a transfer path and a pallet truck to travel on the transfer path and which is configured to transport the support tower from a stand to the assembly station, then from the assembly station to the rocking station.

12. A production line for fuselage sections of an aircraft comprising:
an assembly according to claim 1;
a storage station where panels used to manufacture sections are stored, where each panel is fixed onto a support system of the assembly;
a transfer zone where the panels can be brought from the storage station on a transport carriage;
a preparation station where each panel is fixed to the tower, and which comprises a rocking system configured to rock the transport carriage from a horizontal position to a vertical position facing the tower to be fixed thereto;
an assembly station where the panels mounted on the support tower are fixed to one another to form a section;
a rocking station comprising structure for rocking the support tower and the section that the support tower bears, from a vertical position to a horizontal position to bring an axis of the section into the horizontal position; and
a reception station comprising at least one cradle which receives the section when the section is rocked by the rocking station.

* * * * *